United States Patent [19]

Whitfield

[11] Patent Number: 4,836,141
[45] Date of Patent: Jun. 6, 1989

[54] ODOR CONTROL PET EXCREMENT PAN

[76] Inventor: Roxana R. Whitfield, 1359 Miramonte Ct., Berkeley, Calif. 94703

[21] Appl. No.: 116,227

[22] Filed: Nov. 3, 1987

[51] Int. Cl.$^4$ .............................................. A01K 23/00
[52] U.S. Cl. ........................................................ 119/1
[58] Field of Search ............................................ 119/1

[56] References Cited

U.S. PATENT DOCUMENTS

| | | | |
|---|---|---|---|
| 2,963,003 | 12/1960 | Oberg et al. | 119/1 |
| 3,626,900 | 12/1971 | Failla | 119/1 |
| 3,786,780 | 1/1974 | Pezzino | 119/1 |
| 4,308,825 | 1/1982 | Stepanian | 119/1 |
| 4,469,046 | 9/1984 | Yananton | 119/1 |
| 4,615,300 | 10/1986 | McDonough | 119/1 |

Primary Examiner—Robert Peshock
Attorney, Agent, or Firm—Schapp and Hatch

[57] ABSTRACT

An odor controlling pet excrement container having a substantially flat pan in which is removably mounted a conforming protective liner of flexible sheet material, the liner having a layer of absorptive material and being adapted to contain a layer of litter material if desired. After use, the liner and its contents are removed from the pan and the excrement and litter are sealed within the liner by means of a drawstring. Super absorbent material capable of gelling liquid urine and suitable odor suppressents are incorporated in the liner and its contents.

12 Claims, 1 Drawing Sheet

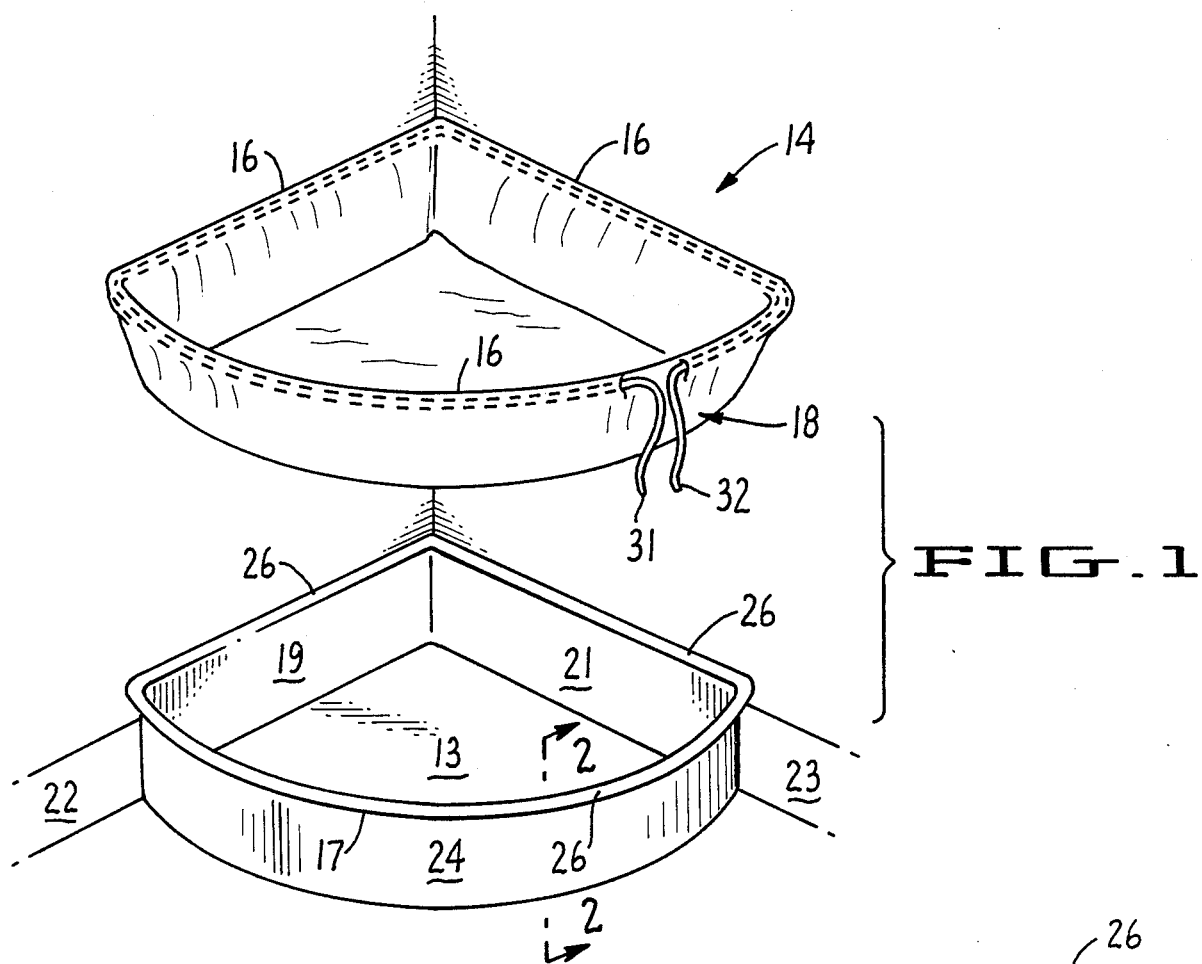
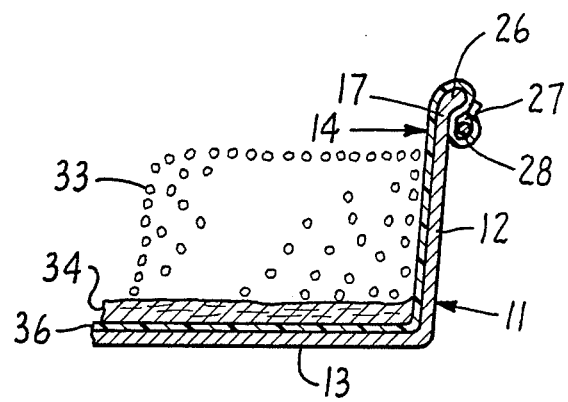
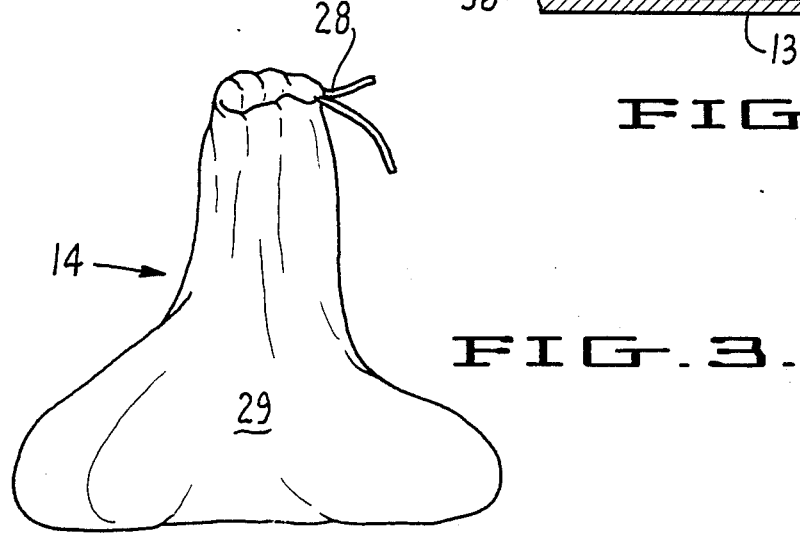

ODOR CONTROL PET EXCREMENT PAN

BACKGROUND OF THE INVENTION

1. Field of the Invention

This invention relates to devices used inside buildings into which pets can release excrement, and more particularly to pans having provision for controlling and eliminating odors produced by such excrement.

2. Description of the Prior Art

When pets are to be confined indoors, it is necessary to provide a place in which they can release liquid urine and solid feces. Conventionally, a fairly shallow pan or tray is provided, and the tray is partially filled with granular absorbtive material commonly called "litter". The litter is supposed to absorb the liquid urine and cover the solid fecal matter.

While such litter trays are reasonably effective when freshly cleaned out and filled with fresh litter, they become quite smelly after even a short time after use and hence must be cleaned and refilled quite often. Cleaning is commonly accomplished by emptying the contaminated litter into a paper bag and placing such bag in the household garbage. The pan must then be washed to removed dried excrement which may be clinging to it. After the pan is dried it is partially filled with fresh litter and it again available for the pet's use.

Attempts have been made to control the offensive odor so that the litter pan can be used for a longer period of time between emptying and cleaning operations. Commonly, this is done by mixing a dry material with the litter which is capable of absorbing odors (such as activated charcoal) or reacting with the liquid urine to release odor-masking chemicals. This solution is only partly effective, and the litter trays must still be emptied and cleaned quite often.

Other attempts to control the odors have been made which involve placing the litter on a perforated screen in such manner that excess liquid urine not absorbed by the litter will drop downwardly through the screen onto an absorptive layer, such as old newspapers, positioned in the bottom of the tray. These devices are complicated and are difficult to empty and to clean before the next use. Typical of such devices are those found in U.S. Pat. No. 4,308,825 to Josephine W. Stepanian, U.S. Pat. No. 4,469,046 to Patrick Yananton, and U.S. Pat. No. 4,615,300 to John P. McDonough.

The above-listed patents are believed to be relevant to the present invention because they were adduced by a prior art search made by an independent searcher, and a copy of each of the above-listed patents is supplied to the Patent and Trademark Office herewith.

The term "prior art" as used herein or in any statement made by or on behalf of the applicant means *only* that any document or thing referred to as prior art bears, directly or inferentially, a date which is earlier than the effective date of this application.

No representation nor admission is made that any of the above-listed documents is part of the prior art in any acceptation of that term, or that no more pertinent information exists.

SUMMARY OF THE INVENTION

The present invention provides a substantially flat pan or tray having an upstanding wall rimming a central area, a liner of flexible sheet material formed to fit within the pan and having a peripheral area formed for removable engagement over the rim of the upstanding wall of such pan, and means for removably securing the peripheral area of the liner over the rim of the upstanding wall of the pan.

The liner is formed with a layer of urine absorbing material and a layer of urine impermeable material. The layer of urine absorbing material is on the upper side of the liner and is capable of absorbing liquid urine discharged into the unit, the impermeable layer serving to prevent any of the liquid or solid excrement from coming in contact with the pan. Thus, when the liner is lifted from the pan, the pan is still clean, does not generate odors, and does not have to be cleaned and washed each time the liner is changed.

The liner of the present invention may be used in the manner described, or may be used in conjunction with a layer of absorbent litter material. The litter material rests upon the liner and satisfies the urges of some pets to dig a hole, deposit excrement in the hole, and cover the hole back up. The litter can also be absorbent and increase the absorptive capacity of the unit.

The urine absorbing layer is preferably formed of highly absorbent cellulosic material capable of absorbing 14 to 15 times its own weight of liquid. The liner and any litter contained thereon is preferably held firmly but releasably in place in fully covering relation to the interior of the pan by means of drawstrings slidably carried in a tube in the peripheral portion of the liner. When placing the liner in the pan, these peripheral portions of the liner are hooked over the upper edge of the pan wall.

Preferably, the upper edge of the pan wall is provided with a bead running therealong which projects outwardly past the wall so that the peripheral area of the liner enclosing the drawstrings hooks over the bead. The drawstrings are then pulled toward each other to tightly grasp the pan wall below the bead, and the drawstrings are tied in a temporary knot. When it is desired to remove the liner from the pan, the knot is untied and the liner and its contents are lifted out of the pan. By reason of the described construction, the liner provides a bag or pouch in which the litter and excrement are contained. The drawstrings are again pulled toward each other until the mouth of the pouch is closed tightly, and the drawstrings are again tied. The resulting sealed bag full of litter and excrement may then be removed to any desired place without danger of releasing strong odors.

As an important feature of the invention, the liner also contains a quantity of super absorbent material capable of gelling liquid urine. A number of such materials are well known and are generally catagorized as "super absorbent powders". These powders are made of urine-reactive polymers, acrylates, starches, or blends thereof. When the liquid urine contacts the super absorbent powders, a gelling action takes place which eliminates the liquid character of the urine and has an odor controlling effect. Of course, the liner and/or the litter placed therein can be provided with odor suppressing materials. The ease with which the liner may be securely installed on the pan, the ease with which the liner can be removed from the pan, and the capability of the removed liner to serve as a disposal bag, cooperate with the relatively long duration of the odor-suppressing effect to provide much improved odor control over any of the prior art.

For convenience in locating the device of the present invention in a spot accessible to the pet, but out of the way of the feet of the people in the household, the pan is formed with perpendicular sections of its upstanding wall adapted for fitting into a corner between adjacent perpendicularly related walls of a building, and the perpendicularly related wall sections are by an outwardly curved wall section. The unit thus is formed to occupy otherwise unused corners in the home.

It is therefore a principal object of the present invention to provide an odor controlling pet excrement container having protective liner capable of receiving liquid and solid animal excrement and capable of functioning as a disposal bag when removed from the receptacle.

Another object of the present invention is to provide an odor controlling pet excrement container of the character described which is capable of solidifying liquid urine received therein.

A further object of the present invention is to provide an odor controlling pet excrement container of the character described which can be used with or without a layer of absorptive litter material.

Another object of the present invention is to provide an odor controlling pet excrement container having a special shape adapting it for use in hitherto used corners in the home.

Other objects and features of advantage will become apparent as the specification progresses and from the claims.

BRIEF DESCRIPTION OF THE DRAWINGS

FIG. 1 is a perspective view of a pan and liner constructed in accordance with the present invention, with the liner being shown in position for insertion into the pan.

FIG. 2 is a vertical cross-sectional view on an enlarged scale taken substantially on the plane of Line 2—2 of FIG. 1.

FIG. 3 is a side elevational view of the liner of FIG. 1 in a sealed bag configuration for disposal of its contents.

While only the preferred form of the invention is illustrated in the drawings, it will be apparent that various modifications could be made without departing from the ambit of the claims.

DESCRIPTION OF THE PREFERRED EMBODIMENTS

As may be seen in the accompanying drawings, the odor controlling pet excrement container of the present invention provides a substantially flat pan 11 having an upstanding wall 12 rimming a central area 13, a liner 14 of flexible sheet material formed to fit within the pan 11 and having a peripheral area 16 formed for removable engagement over the rim 17 of the wall 12, and means 18 for removably securing the peripheral area 16 over the rim 17 of the wall 12.

In order to adapt the unit for use in otherwise unused corners in the house, the pan 11 is here shown as being formed with perpendicular sections 19 and 21 of the wall 12 adapted for fitting into a corner between adjacent perpendicularly related walls 22 and 23 of a building, the wall sections 19 and 21 being joined by an outwardly curved wall section 24.

As may best be seen in FIG. 2 of the drawings, the rim 17 of the pan 11 is provided with a bead 26 running therealong and projecting outwardly past the wall whereby the peripheral area 16 of the liner 14 can be hooked over the bead 26 when the liner 14 is installed in the pan 11. The peripheral area 16 of the liner 14 is formed to provide a tube 27 in which is slidably mounted a drawstring 28 formed for pulling the peripheral area 16 tightly against the wall 12 below the bead 26. The ends 31 and 32 of drawstring 28 are then tied in a temporary knot, and the liner 14 is held securely in place in the pan 11.

As may best be see in FIG. 3 of the drawings, the drawstring 28 is also formed for pulling the peripheral area 16 tightly together to provide a closed bag or pouch 29, after the liner 14 and excrement, etc. contained therein have been removed from the pan 11.

The liner 14 may be used in the pan 11 either with or without a layer of granular litter 33 when fitted within the pan 12. The litter 33 and liner 12 are also capable of incorporating odor suppressants.

As may best be seen in FIG. 2 of the drawings, the liner 14 is formed with a layer 34 of urine absorbing material, such as 100% bleached standard wood pulp, and a layer 36 of urine impermeable material. The layer 36 is preferably made of thin polyethylene material of the type conventionally used in garbage bags.

In accordance with the present invention, a quantity of super absorbent material capable of gelling liquid urine is supported within the liner 14, either loosely or by incorporating it into the urine absorbing layer 34. Various well known odor suppressant materials, such as activated charcoal, odor masking chemicals, and the like, can be incorporated in the litter 33, or the absorbent layer 34, or may be placed separately within the liner 14.

From the foregoing, it will be apparent that the odor controlling pet excrement container of the present invention is particularly effective in controlling and eliminating unwanted odors from pet excrement by confining all odor producing material to a liner which also functions as a disposal bag when the liner and its contents are removed from the holding pan. Because the liner protects the pan against contact with the animal excrement, the onerous chore of washing out the pan is eliminated. Making the pan ready for further use by the pets is accomplished by simply removing the liner, replacing it with a clean liner and litter material if desired, and quickly disposing of the used liner and its contents in a garbage can or other convenient place, the construction of the sealed bag provided by the liner insuring that undesirable odors will not be present.

What is claimed is:

1. An odor control pet excrement container, comprising
a substantially flat pan of substantially rigid material having an upstanding wall rimming a central area,
a liner of flexible sheet material formed to fit within said pan and having a peripheral area formed for removable engagement over the rim of said wall,
and means for removably securing said peripheral area over the rim of said wall.

2. An odor control pet excrement container as described in claim 1, and wherein said pan is formed with perpendicular sections of said wall adapted for fitting into a corner between adjacent perpendicularly related walls of a building, said perpendicular wall sections being joined by an outwardly curved wall section.

3. An odor control pet excrement container as described in claim 1, and wherein said rim of said pan is provided with a bead running therealong, said bead projecting outwardly past said wall whereby said peripheral area of said liner hooks over said bead, said peripheral area being provided with a drawstring formed for pulling said peripheral area tightly against said wall under said bead.

4. An odor control pet excrement container as described in claim 3, and wherein said drawstring is also formed for pulling said peripheral area tightly together to provide a closed bag.

5. An odor control pet excrement container as described in claim 1, and wherein said liner is formed for containing a layer of granular litter when fitted within said litter pan.

6. An odor control pet excrement container as described in claim 5, and wherein said litter and said liner incorporate odor suppressants.

7. An odor control pet excrement container as described in claim 1, and wherein said liner is formed with a layer of urine absorbing material and a layer of urine impermeable material.

8. Apparatus for receiving animal excrement, comprising
 a substantially flat pan of seamless molded construction having an upstanding wall surrounding a central area,
 a liner of flexible sheet material formed to fit within said pan and our said wall to support a layer of granular litter,
 said liner being removable from said pan with said litter and any accompanying animal excrement enclosed as in a bag,
 said liner having a moisture impermeable outer layer whereby any free liquids in said excrement are confined in said liner and means for sealing said bag with said litter and excrement therein.

9. An odor control pet excrement container as described in claim 8, and wherein said liner also provides a urine absorbing layer of highly absorbent cellulosic material.

10. An odor control pet excrement container as described in claim 8, and wherein said liner also supports a quantity of super absorbent material capable of gelling liquid urine.

11. An odor control pet excrement container as described in claim 10, and wherein said quantity of super absorbent material is incorporated into a urine absorbing layer of highly absorbent cellulosic material.

12. An odor control pet excrement container as described in claim 11, and wherein said liner incorporates odor suppressants.

* * * * *